United States Patent
Broxon, II et al.

[19]

[11] Patent Number: 5,886,663
[45] Date of Patent: Mar. 23, 1999

[54] DOPPLER-BASED RADAR SYSTEM SELF TEST CIRCUIT AND RELATED METHOD

[75] Inventors: John H. Broxon, II, Owensboro; Daniel P. Bowlds, Hawesville, both of Ky.

[73] Assignee: MPH Industries, Inc., Owensboro, Ky.

[21] Appl. No.: 908,373

[22] Filed: Aug. 7, 1997

[51] Int. Cl.[6] ..................................................... G01S 7/40
[52] U.S. Cl. .......................... 342/165; 342/169; 342/171; 342/173; 342/174
[58] Field of Search .................................. 342/171, 165, 342/169, 173, 174

[56] References Cited

U.S. PATENT DOCUMENTS

| | | | |
|---|---|---|---|
| 3,277,477 | 10/1966 | Evans | 342/104 |
| 3,697,876 | 10/1972 | Robbins et al. | 342/47 |
| 3,706,994 | 12/1972 | Uhrig | 342/165 |
| 3,750,171 | 7/1973 | Faris | 342/112 |
| 3,774,206 | 11/1973 | Rauch | 342/89 |
| 3,787,866 | 1/1974 | Gamertsfelder et al. | 342/171 X |
| 4,656,481 | 4/1987 | Mawhinney | 342/171 |
| 5,012,250 | 4/1991 | Foley | 342/53 |
| 5,027,127 | 6/1991 | Shnitkin et al. | 342/372 |
| 5,287,111 | 2/1994 | Shpater | 342/28 |
| 5,432,516 | 7/1995 | Cherry et al. | 342/28 |
| 5,469,172 | 11/1995 | Schleder et al. | 342/174 |
| 5,689,266 | 11/1997 | Stelling et al. | 342/165 |

*Primary Examiner*—John B. Sotomayor
*Attorney, Agent, or Firm*—King and Schickli

[57] ABSTRACT

A Doppler-based radar system used in monitoring the speed of moving vehicles includes a self test circuit and related method for independently and remotely testing the operability of the entire radar system including the critical microwave components. The self test circuit includes a low frequency modulation diode positioned adjacent the antenna horn. The modulating diode causes a change in the voltage standing wave ratio seen by the radar system(s), thereby modulating the energy of the reflected radar test signal. The modulated test signal is compared to the original test signal and a resultant control signal is generated. The radar system is combined with a retarder system controller and a control system computer to provide an industrial control application, such as for controlling railway cars in a hump yard. Any number of additional radar systems/retarder system controllers can be added to expand the application.

15 Claims, 3 Drawing Sheets

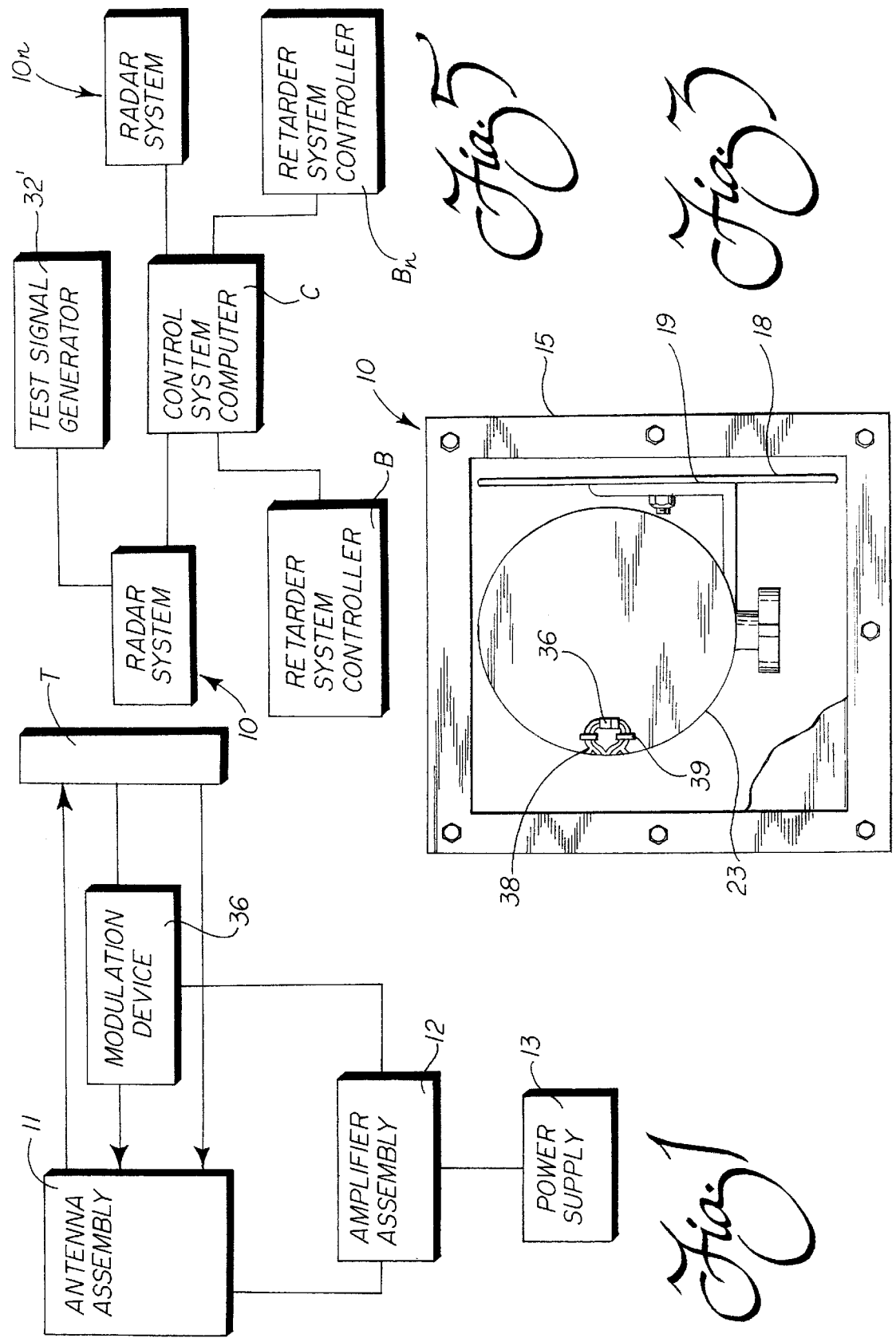

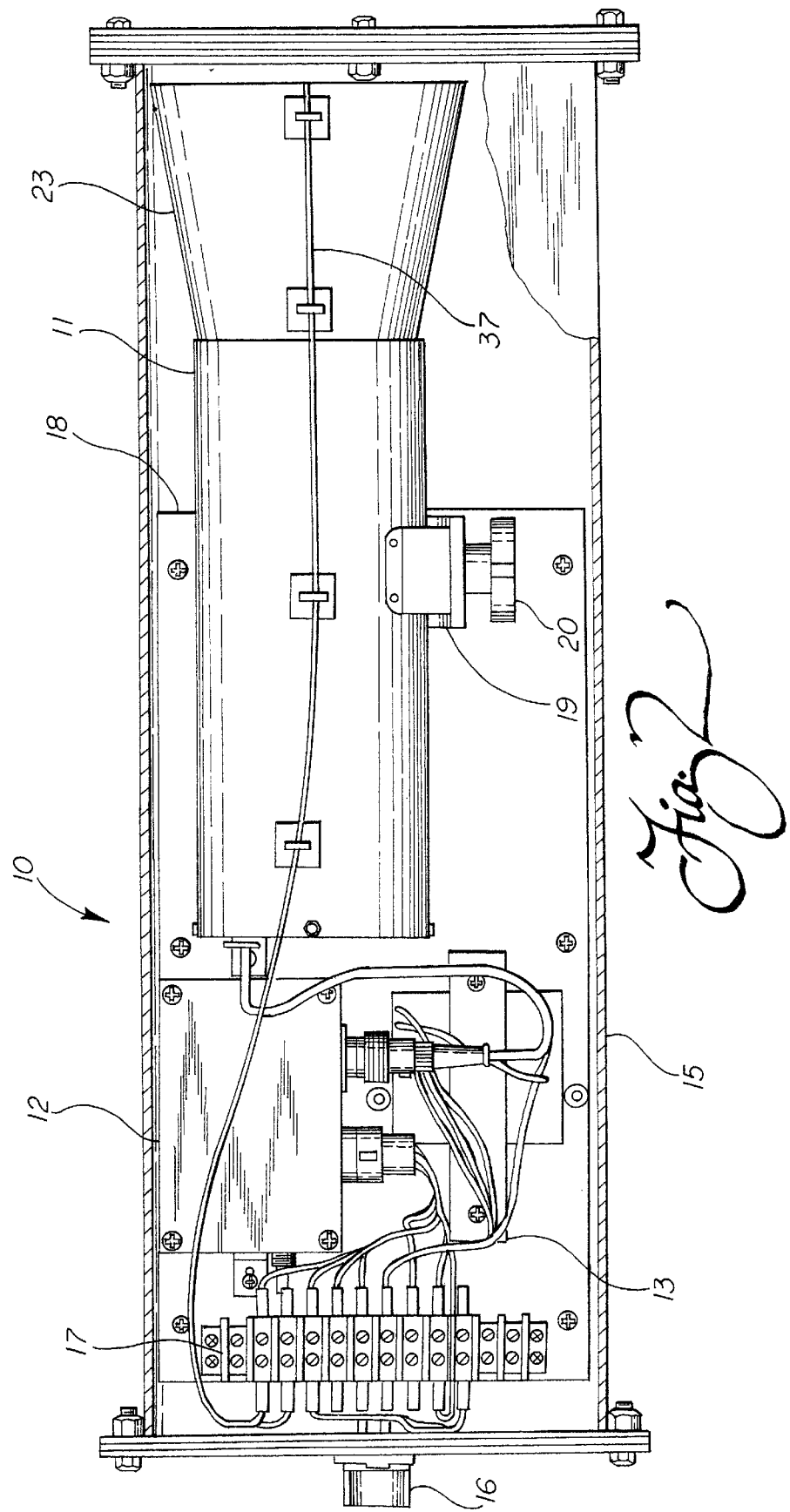

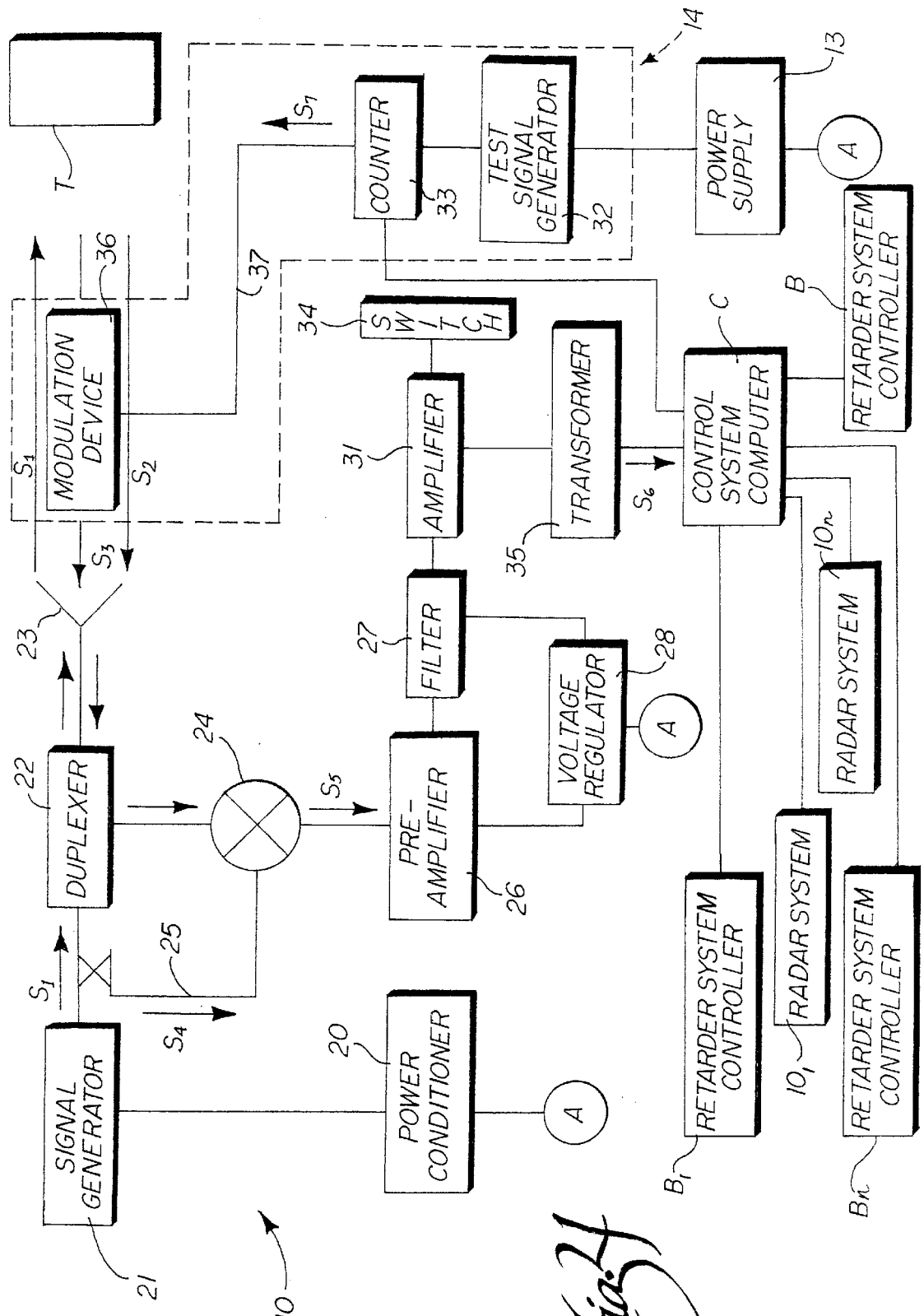

DOPPLER-BASED RADAR SYSTEM SELF TEST CIRCUIT AND RELATED METHOD

TECHNICAL FIELD

The present invention relates generally to a Doppler-based radar system and, more particularly, to a self test circuit and related method of testing the operability of the radar system.

BACKGROUND OF THE INVENTION

The increasing use of Doppler-based radar systems to provide information used in the control of critical industrial equipment places greater emphasis on the reliability, and necessarily, the continuous operability of such systems.

One particular application involving the use of radar systems in the control of critical equipment is in railroad classification yards. More specifically, radar systems are presently being utilized in hump yards where individual and groups of rail cars travel through a series of switches and retarder sections in order to redistribute themselves to their designated trains. The combination of computer controlled switching and retarding operations provides control of both the direction and the speed of the rail cars.

As the cars approach the individual retarder sections, magnetic wheel sensors operate to determine their presence. Upon receiving an appropriate indicator signal from the wheel sensor, the dedicated radar system operates to monitor the speed of the rail car and to continuously relay this information to the hump yard control system computer. In response, the control system computer continuously keeps track of the position and speed of the car. In turn, it controls the switches to send the car to the proper spur, or parallel rail make-up line, where that particular train is being assembled, and it adjusts the retarding force applied to the wheels of the car while it travels through each retarding section. These continuous adjustments to the retarding force are designed to slow the cars from the standard speed established by gravity over the hump to an optimal exit speed.

Upon exiting the primary retarder section, the cars travel through a secondary retarder section and/or then through the series of switches which direct the cars to the proper parallel rail make-up line where they engage and couple with the next-in-line car in the designated train. Ideally, the desired speed at which proper coupling occurs without damaging the rail car's coupling mechanisms or internal cargo is about four miles per hour.

A failure in any portion of the hump yard control system, and particularly in the individual radar systems, can of course result in a collision, and even rail car derailment. The expense of repair and the system downtime due to such an accident is particularly costly. Thus, there is a distinct need identified to minimize, or preferably eliminate altogether, the potential occurrence of such radar system failures.

In view of this need, various methods and apparatus for testing the operability of Doppler-based radar systems have evolved. One particular method presently utilized to test hump yard radar systems, as well as other radar systems, involves interposing a test signal directly into the radar system's amplifiers and/or counting circuitry, thus bypassing the antenna, receiving diode and other of the critical microwave components. In this method, the output of the radar system under test is intermittently compared to the known input signal by manual observation. This method of testing radar systems is thus adequate to only test the system's amplifiers and/or internal counting circuitry. However, the method falls short of determining the overall operability of the entire system; most importantly, with respect to the microwave components, as mentioned above. Surveys have found that typically it is these microwave components that incur the greatest number of critical failures. The fact that these components are not subjected to a test for operability by this prior system is a serious shortcoming.

Indeed, a failure in any of the microwave components of a radar system can result in a false signal reading of 2–3 miles per hour. This false signal reading in one common occurrence is the result of signal noise from the surrounding radar systems and other sources throughout the hump yard. Unfortunately, these false signal readings not only prevent operation at the optimal exit speed for the rail cars, but the magnitude of the error compared to the optimal speed is enough to not only risk substantial damage to the couplers and undercarriage of the car, but cause the derailment, as mentioned above. In other words, with a microwave component failure, the hump yard control system computer incorrectly opens the retarders allowing the cars to proceed uncontrolled through the section, and thus maintain the excessive speed that causes the problem.

In addition to the self test method described above, additional methods and apparatus are known which are capable of testing the operability of the entire radar system. One such method uses the moving tines of a tuning fork to simulate a moving target. In this manner, the entire radar system can be evaluated by monitoring the resulting output of the system. An output reading corresponding to the frequency of the tuning fork indicates the proper operation of the overall radar system, including its microwave components.

Although this particular method is thus capable of testing the entire radar system, its use in hump yards, as well as in numerous other systems utilizing Doppler radar systems in the control of critical industrial equipment, is of limited utility. Specifically, the use of tuning forks requires the relatively frequent presence of personnel in the hump yard. As will be recognized, this makes the test operation labor intensive and increases the operation cost significantly. In addition to increasing the operating costs of the hump yard, it introduces the factor of human error, which can lead to the same deleterious results that are being attempted to be overcome.

An apparatus described in U.S. Pat. No. 4,656,481 to Mawhinney utilizes a separate, outside generated test signal for checking and calibrating a radar system. This instrument utilizes a modulation device to generate an acoustic signal of known frequency. The output of the radar unit under test is manually monitored for the proper visual and acoustic outputs. When used as a medical device, the '481 patent discloses the use of the piezoelectric sounder for producing pulses indicative in amplitude and duration of a heartbeat. These pulses create the acoustic signal which is manually monitored by the technician performing the calibration procedure. Thus, while the '481 patent discloses the use of a modulated test signal, there is no method of self-generating the test signal with the radar system under test, modulating the frequency of the test signal, or of monitoring the output of the system remotely to determine its overall operability.

Therefore, each of these prior art methods and apparatus are of limited utility in testing radar systems, and particularly the operability of the system components, that are used to remotely control critical industrial equipment. For example, these prior art methods may be appropriate to test traffic speed measurement radar systems, but not appropriate to be used as a highly reliable and stand alone system for monitoring and controlling industrial equipment. Indeed, it is not a problem for a police officer to periodically ring a tuning fork and visually observe and compare the resulting speed readout to the standard of the tuning fork. On the other hand, in cases where radar systems control critical industrial equipment, and the tests must be performed by remote control, preferably each time the system operates and without introducing the factor of human error, the prior art methods fall short. At the same time, holding down the operational costs, is an important consideration where the prior art systems are also sorely deficient.

Thus, there is a need identified for a highly efficient and economical Doppler-based radar system having a self test circuit for use in remotely determining the overall operability of the entire radar system, including the microwave components, as well as the over-all industrial control application.

SUMMARY OF THE INVENTION

Accordingly, it is a primary object of the present invention to provide a method and apparatus for overcoming the limitations of the prior art in monitoring the overall operability of a Doppler-based radar system.

It is another object of the present invention to provide an improved method and apparatus for monitoring the operability of the critical microwave components of a Doppler-based radar system.

Still another object of the present invention is to provide an improved Doppler-based radar system and self test circuit capable of remote and independent operation without the presence of personnel, as well as an improved industrial control application, thus reducing operational costs and the chance for human error.

Yet another object of the present invention is to provide a Doppler-based radar system and self test circuit capable of efficient repetitive operation, such that a self test can be performed prior to each system operation.

It is a related object of the present invention to provide an improved method/apparatus for independently monitoring and self testing one or more radar systems, including the microwave components of each, and wherein is provided a signal generator providing a self-generated or remote test signal that is modulated, thus simulating a moving target.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, there is provided an improved Doppler-based radar system or the like having a self test circuit, for remotely and independently testing the operability of the entire radar system. In particular, the method is concerned with modulating a reflected radar test signal generated by the system under test, thus producing a simulated target used to determine the operability of the system.

In accordance with an important aspect of the present invention, the self test circuit is capable of independent operation in remote locations. Specifically, the radar system self test is initiated upon receipt of an appropriate control/enabling signal. For example, a magnetic wheel sensing device, or similar such sensors can be utilized to generate the enabling signal directly, or through a control computer in concert with additional sensors, each time a rail car exits a hump yard retarder section. In accordance with the broadest aspects of the present invention, the enabling signal can also be generated by any type of independently positioned sensing device or by the radar system itself, such as upon determining the absence of a moving target. That is to say, after the moving target has left the radar beam, a zero speed indication may be used to trigger a self test enabling signal. Advantageously, it should be appreciated that this method of initiating the radar system self test can be performed efficiently, independently, continuously, and on an economical basis without the need for the presence or assistance of personnel.

In accordance with another important aspect of the present invention, the radar system self test circuit operates to independently test the entire radar system, including the signal generator or oscillator, the duplexer, and the antenna, among the other microwave components. Preferably to do this, the radar system under test self generates and transmits the test signal equal in frequency to the standard operating signal. A portion of the transmitted test signal reflects off of the surrounding objects toward the radar system and is received by the system antenna. Alternatively, a separate remote signal generator may be used for multiple systems.

Prior to receipt of the reflected return signal by the system antenna, the signal is modulated by a modulating or semi-conducting device. The modulating device is positioned in the path of the radar beam inside of or in close proximity to the antenna and operates to change the voltage standing wave ratio seen by the radar system. This, in effect, modulates the reflected return signal producing a simulated target of known velocity. This simulated target velocity signal is used to determine the operability of the radar system by comparison with the transmitted signal in a receiving diode. Advantageously, this self test method is capable of testing the entire radar system(s), including the internal counting circuitry, as well as the microwave components mentioned above, preferably prior to each system operation.

In practicing the preferred method, the step of determining the operable status of the radar system is performed by comparing the frequency of the modulated return signal to the frequency of the original self generated or remote transmitted test signal. To accomplish this step, a receiving diode is utilized to detect the difference in frequency between the two signals and to provide a resultant control signal having a frequency equal to the detected difference. The frequency of the resultant signal is approximately equivalent to the frequency of the modulating signal used to drive the modulating device, thus indicating the overall operability of the radar system. It will be obvious to those skilled in the art that various modulating signal frequencies can be utilized depending upon the particular industrial control application for which the radar system is utilized.

In further carrying out the inventive method, it is desirable to add the step of generating a control signal indicative of the operable status of the radar system. In this manner, the control system computer of the industrial control application can take corrective action in the event a failure in any of the radar system components is determined. To achieve this step, the resultant signal generated by the receiving diode is forwarded to the control system computer, and/or to the retarder system controller of the industrial control application, of which the radar system is a part. Depending upon the frequency of the signal, the control system computer determines whether or not to release the next rail car into the retarder section, or to halt operations by holding the release of the next rail car until the radar system is operating properly.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serves to explain the principles of the invention. In the drawings:

FIG. 1 is a schematic block diagram of the Doppler-based radar system of the present invention;

FIG. 2 is an elevational side view of the radar system of the present invention;

FIG. 3 is an elevational front view of the radar system of the present invention, specifically showing the modulating device mounted near the mouth of the antenna;

FIG. 4 is a detailed schematic block diagram of the Doppler-based radar system of the present invention, including the self test circuit, and illustrated as a part of the overall inventive industrial control system utilizing the radar system; and FIG. 5 is a schematic block diagram illustrating an alternative embodiment of the invention in which a remote signal generator is used to service multiple radar systems.

Reference will now be made in detail to the present preferred embodiment of the invention, an example of which is illustrated in the accompanying drawings.

DETAILED DESCRIPTION OF THE INVENTION

With reference now to the schematic block diagram of FIG. 1, there is shown a preferred embodiment of a Doppler-based radar system 10 for use in monitoring the speed of moving vehicles. The radar system 10, comprises three subassemblies including antenna assembly 11, an amplifier assembly 12, and a power supply assembly 13. As described in greater detail in FIG. 4, the radar system includes a self test circuit, outlined in dashed lines and given reference numeral 14, for remotely and independently testing the operability of the entire radar system.

As best shown in FIG. 2, a weatherproof enclosure 15 houses the three subassemblies of the radar system 10. An external connector 16 allows the radar system 10 to receive external source power and to send and receive control signals from a control system computer of the industrial control application.

Within the enclosure 15, the amplifier assembly 12, the power supply 13 and terminal board 17 are individually mounted to isolation plate 18. Isolation plate 18 is designed to reduce the potential for damage to the system components caused by shock and/or vibration loads incurred by the enclosure 15. Antenna assembly 11 is adjustably mounted to L-bracket 19 which in turn is mounted to isolation plate 18.

Adjustment knob 20 is provided, thus allowing for directional adjustment of the antenna assembly 13 and necessarily, the transmitted radar signal.

As best depicted in the detailed schematic block diagram of FIG. 4, during normal operation of the radar system 10, an X-band Gunn diode oscillator 21 is provided to generate a constant wave radar signal, designated S1, of a fixed frequency ($f_r$) of 10.525 GHz. The radar signal S1 is passed through duplexer 22 to microwave radar antenna 23. In the preferred embodiment, antenna 23 is a circularly polarized horn antenna of conventional design having a half-power beam width of twelve (12) degrees in azimuth and elevation. The antenna 23 forms a transmitter to send the test signal S1 towards target T and then, to receive the reflected test signal S2.

In accordance with the well known Doppler principle, if the target is moving toward or away from the antenna 23 the frequency ($f_r$) of the transmitted signal is shifted ($f_r \pm d$) upon contacting the target T, thus forming the reflected radar signal S2 in accordance with the speed of the target.

The reflected signal S2, is received by antenna 23 and forwarded to duplexer 22. Duplexer 22 forwards the signal S2 to receiving diode 24. Receiving diode 24 receives the reflected signal S2 along with a leakage signal S4 comprised of a portion of the output of oscillator 21 along shunt coupler 25. The frequency of the leakage signal S4 is equivalent to that of the transmitted signal S1 generated by oscillator 21.

In accordance with conventional Doppler radar techniques, the output or resultant signal S5 of receiving diode 24 is correlative to the Doppler frequency difference (d) between the frequency of the reflected radar signal S2 and the leakage signal S4. This resultant signal S5 is typically in the audio range or around 100 Hz–3 kHz.

In the preferred embodiment, a pre-amplifier circuit includes a low-noise pre-amplifier 26 and a Chebychev high pass filter 27 for conditioning resultant signal S5 prior to being received by amplifier assembly 14. A voltage regulator 28 in the pre-amplifier circuit provides power to pre-amplifier 26 and high pass filter 27. Similarly, variable-voltage power conditioner/supply 20 delivers conditioned power to a signal generator 21, which in the preferred embodiment takes the form of an oscillator.

As shown in FIG. 1, power supply 13 operates in the preferred embodiment to convert a +24 VDC external source power, received through external connector 16, into the ±15 Volt energy required for operation of the radar system 10. Dependent upon the available source power and the particular application, other types of power supplies or converters can be used. For example, an AC-to-DC converter can be utilized to provide the required ±15 Volt energy from an AC external source for system operation.

Amplifier assembly 12 includes an amplifier 31, an isolation transformer 35, an oscillator 32 and a ripple counter 33. The signal conditioning amplifier 31 receives resultant signal S5 from the pre-amplifier circuit board or specifically, from high pass filter 31. This signal S5, indicative of the target speed, causes amplifier 31 to clip the signal, thus providing a constant differential signal with a level of 12 to 16 volts peak-to-peak for the entire time that a target is within the radar beam. The level of gain of the amplifier 31 is adjustable to five different levels using rotary switch 34.

The constant level signal S6, clipped by amplifier 31, is next isolated by transformer 35 prior to exiting the radar system 10 through external connector 16. In the preferred embodiment, a control system computer C or the like receives signal S6 which is indicative of the presence of a moving vehicle. The frequency of signal S6 of the preferred embodiment illustrated and described is 31.39 Hertz times the actual speed of the moving target.

The control system computer C continuously monitors signal S6 to determine the speed of the moving vehicle in the retarder section and generates a control signal corresponding to the required operation of the retarder system controller B. Depending upon the speed of the vehicle, the control system computer C controls the retarder system controller B to allow the vehicle to continue travelling at its present speed or to incrementally slow the vehicle until the optimal exit speed is attained.

As further illustrated in FIG. 4, the industrial control system described above, in addition to the primary radar system 10, retarder system controller B, and control system computer C, can be expanded to include any number of additional radar systems $10_1$–$10_n$ and retarder system controllers $B_1$–$B_n$. This allows monitoring and controlling additional retarder sections along tracks in the hump yard. Each of the additional radar systems $10_1$–$10_n$ and retarder system controllers $B_1$–$B_n$ are thus monitored, controlled and coordinated with the primary computer C in a very efficient manner.

In accordance with the preferred embodiment of the present invention, the self test circuit 14 of radar system 10, indicated by the dashed line outline in FIG. 4, is comprised of the conventional signal generator 32 and the ripple counter 33 of the amplifier assembly 12, and a low frequency modulating diode 36 attached to antenna 23. As best shown in FIG. 3, the modulating diode 36 is attached to a plastic support ring 38 using tie wraps 30. This assembly is further attached to antenna 23. It is of critical importance that the modulating diode 36 is positioned within the path of the reflected radar beam. However, it should be appreciated that the modulating diode 36 can be placed anywhere within the radar beam, for example, an alternate embodiment is where the diode 36 is placed a distance away from the edge of antenna 23 by attachment directly to enclosure 15.

The self test circuit signal generator 32 in the preferred embodiment is a 16.08 kHz crystal oscillator used to generate the required reference signal. The signal is next divided by the counter 33, such as by thirty-two using a CD4060B CMOS ripple counter in the preferred embodiment to provide the resulting reference signal S7, a 502.5 Hz pulse train. Reference signal S7 is delivered to the modulating diode 36 by line 37. In the preferred embodiment, the modulating diode 36 is a 1N34B Germanium signal diode.

In an alternate embodiment of the present invention as shown in FIG. 5, the required reference signal may be generated remotely by signal generator 32' and transmitted to the radar systems $10$–$10_n$ through lines that feed into each system through its multi-pin connector 16 (see FIG. 2). For example, in the expanded industrial control application utilizing several systems as described above, one signal generator 32' could be utilized to generate the required reference signal for all of the radar systems $10$–$10_n$.

In the preferred embodiment, the reset pin of ripple counter 33 is pulled to ground to initiate the self test operation. Upon receipt of the enabling/initiating signal through external connector 16 from control system computer C, the reference signal S7 is delivered to the low frequency modulating diode 36. The 502.5 Hz pulse train effectively corresponds to 16.0 miles per hour for an X-band transmitter frequency of 10.525 GHz in this preferred embodiment illustrating the present invention. The modulating diode 36 operates to modulate the reflected return signal S2, thus forming modulated signal S3. The antenna 23 receives modulated signal S3 and processes the signal in the manner described above for normal operation of the radar system 10.

It should be appreciated that in the preferred embodiment, a fully functional radar system provides a sixteen miles per hour output reading as a result of the self test operation. This is due to the absence of any moving targets within the radar beam during the self test operation and the predetermined frequency of the reference signal S7.

Importantly, the power level of reference signal S7 is such that if a moving target is inadvertently within the radar beam during a self test operation, the strength of the moving target return signal overrides the self test signal, thereby avoiding any potential problems resulting from an unexpected or erroneous output caused by the moving target.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the modulating diode can be replaced with any semiconducting device or piezoelectric device to modulate the reflected return signal S2.

Also, this preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method of self testing a Doppler-based radar system including an antenna for transmitting and receiving test signals comprising the steps of:

transmitting a test signal from said antenna;

modulating a reflected portion of said test signal;

receiving said modulated reflected signal with said antenna; and determining the status of said radar system, whereby the status of said radar system is determined such that corrective action may be taken in the event an inoperable condition is found in said radar system.

2. The method as claimed in claim 1, further including the step of generating a control signal indicative of the operable status of said radar system.

3. The method as claimed in claim 2, further including the step of forwarding said control signal to a computer, whereby corrective action can be taken dependent upon the operable status of said radar system.

4. The method as claimed in claim 3, wherein the step of modulating said reflected portion of said test signal includes modulating a semiconducting device, whereby the voltage standing wave ratio seen by said radar system is changed producing a simulated test target.

5. The method as claimed in claim 4, wherein said semiconducting device is a diode.

6. The method as claimed in claim 1, wherein the step of determining the status of said radar system includes determining the difference in frequency between said test signal and said modulated test signal; and generating a control signal dependent upon said difference, said control signal indicative of the status of said radar system such that corrective action may be taken in the event an inoperable condition is found in said radar system.

7. A method of self testing microwave components of a Doppler-based radar system including an antenna for transmitting and receiving test signals comprising the steps of:

transmitting a test signal from said antenna;

modulating a reflected portion of said test signal;

receiving said modulated reflected signal with said antenna; and determining the status of said microwave components, whereby the status of said components of said radar system is determined such that corrective action may be taken in the event an inoperable condition is found in said components.

8. The method as claimed in claim 7, further including the step of generating a control signal indicative of the operable status of said radar system.

9. The method as claimed in claim 8, further including the step of forwarding said control signal to a computer, whereby corrective action can be taken dependent upon the operable status of said radar system.

10. A Doppler-based radar system for use in monitoring the speed of moving vehicles includes a self test circuit for remotely testing the operability of said radar system comprising:

a first signal generator to generate a test signal;

said self test circuit operable to modulate a reflected portion of said test signal;

a transmitter to transmit said test signal and to receive said modulated test signal; and circuitry responsive to said modulated test signal to detect the status of said radar system, whereby the status of said radar system is determined such that corrective action may be taken in the event an inoperable condition is found in said radar system.

11. The system of claim 10, wherein said detection circuitry comprises a receiving diode, said diode operable to detect the difference in frequency between the test signal and the modulated test signal, and to provide a control signal having a frequency substantially equal to the detected frequency difference, whereby the operable status of said radar system can be determined.

12. The system of claim 10, wherein said self test circuit of said radar system comprises:

a modulation device connected inside or in close proximity to said transmitter; and a second signal generator for generating a reference signal to drive said modulation device, whereby the voltage standing wave ratio seen by the radar system is changed producing a simulated test target such that the operability of said radar system can be determined.

13. An industrial control system for controlling equipment comprising:

at least one radar system including a self test circuit for use in monitoring the speed of moving objects, said radar system having a first signal generator to generate a test signal;

said self test circuit including a modulation device operable to modulate a reflected portion of said test signal, a transmitter to transmit said test signal and to receive said modulated test signal, and circuitry responsive to said modulated test signal to detect the status of said radar system;

at least one controller; and a computer for monitoring and controlling said at least one radar system and said at least one controller, whereby the status of said radar system is monitored and corrective action by said controller may be initiated by said computer in the event an inoperable condition is detected in said radar system.

14. An industrial control system for controlling equipment comprising:

at least two radar systems for use in monitoring the speed of moving objects, said radar systems having self test circuits for testing the status of said radar systems;

a signal generator remote from said radar systems for generating a reference signal to drive said self test circuits;

at least two controllers; and a computer for monitoring and controlling said at least two radar systems and said at least two controllers, whereby the status of said radar systems is monitored and corrective action by said controller may be initiated by said computer in the event an inoperable condition is detected in one of said radar systems.

15. The system of claim 14, wherein said self test circuits include a modulation device for producing a simulated target, whereby the status of said radar systems can be determined.

* * * * *